UNITED STATES PATENT OFFICE.

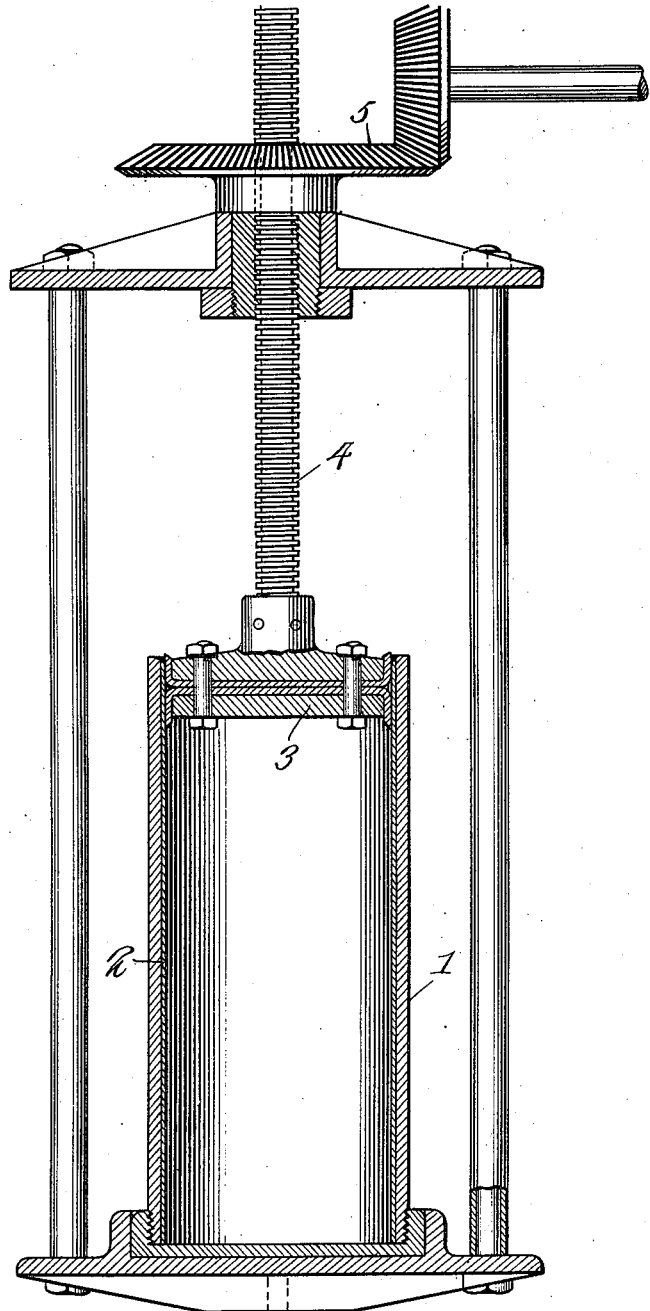

FRANK BAKER AND HYMAN BAKER, OF MOUNT PLEASANT, SOUTH CAROLINA.

PROCESS OF SALTING PEANUTS IN THE SHELL.

966,514.  Specification of Letters Patent.  Patented Aug. 9, 1910.

Application filed September 25, 1909. Serial No. 519,535.

*To all whom it may concern:*

Be it known that we, FRANK BAKER and HYMAN BAKER, citizens of the United States, residing at Mount Pleasant, in the county of Charleston and State of South Carolina, have invented new and useful Improvements in Processes of Salting Peanuts in the Shell, of which the following is a specification.

The invention relates to a new and improved process of treating peanuts or other nuts while in the shell, being more particularly directed to a method of producing salted peanuts without necessitating the removal of the nut from the shell, thereby insuring absolute cleanliness and purity of the finished product.

In the usual method of producing salted peanuts the shells are first removed and the nuts boiled in a saline solution. This method is objectionable as it necessarily exposes the nut to any existing deleterious influences and at best produces an indigestible product as a result of the boiling.

The present invention is designed to obviate each and all of the objections to the present method of producing the product, and in impregnating the meat with the saline solution without breaking or otherwise separating the shell, whereby the product is delivered to the consumer in its original condition of cleanliness and purity. Furthermore, the present method is a distinct advantage from a commercial standpoint, as it entirely avoids the necessity of shelling the nuts or the use of a heated solution.

In carrying out the improved method, the nuts in their original green state are placed in a suitable container and there is added thereto the desirable quantity of the saline solution. Pressure is then applied, which in the green condition of the shells, readily forces open the pores of the shells and introduces therein the saline solution. The nuts, still within the shells, are subjected to the action of heat to evaporate the liquid within the shells, and the nuts then roasted in the usual manner. The result is a nut uniformly impregnated with the salt, delivered to the consumer in its original condition of cleanliness and purity, and wholly lacking the indigestible quality incident to boiling under the old method.

As a simple illustrative type of the apparatus for carrying out the improved method, the accompanying drawing shows a vertical sectional view of such, in which 1 represents a container or cylindrical vessel, of appropriate size, and of a material to resist the pressure, said vessel preferably having a lining 2 of a material, as brass, which would be unaffected by the solution. The cylinder is closed at the lower end and open at the upper end, and a follower is arranged therein having airtight connection with the interior surface of the cylinder. The follower 3 is provided with a stem 4, and feeding means 5 of any desired construction is arranged to operate the follower longitudinally of the cylinder.

The peanuts and saline solution are introduced into the cylinder and the follower gradually forced lengthwise the cylinder to induce that pressure on the solution as will compel the latter to enter the pores of the shells.

The salient feature of the present invention resides in the method of introducing a nut treating solution into the shell of a nut without breaking said shell, whereby the article may be delivered to the consumer in its original condition of purity and cleanliness with the shell unbroken.

While the improved method is particularly applicable to salting peanuts it is to be understood that we do not limit it thereto, as it may be utilized with equal facility for introducing into the shell any nut treating solution, and used with any shelled nut.

We claim:—

1. The herein described method of treating nuts while in the shell consisting in introducing the treating solution while cold through the pores of the shell by pressure.

2. The herein described method of treating nuts while in the shell consisting in immersing the nuts with their shells unbroken in the treating solution, subjecting the nuts and solution to pressure to simultaneously force the air from the shells and introduce the solution therein, and evaporating the shell contained liquid.

3. The herein described method of salting peanuts consisting in forcing the cold saline solution through the pores of the shells by pressure.

4. The herein described method of salting peanuts, consisting in immersing the nuts with their shells unbroken in a cold saline solution and subjecting the nuts and solution to pressure sufficient to force the solution into the nuts.

5. The herein described method of salting peanuts consisting in forcing the saline solution through the pores of the unbroken shell to simultaneously force the air from the shell and introduce the solution therein, and evaporating the liquid from the shell.

6. The herein described method of salting peanuts consisting in forcing the saline solution through the pores of the shell to simultaneously force the air from the shell and introduce the solution therein, evaporating the liquid from the shell, and roasting the nuts.

7. The herein described method of salting nuts consisting in immersing the nuts with their shells unbroken in the treating solution, subjecting the nuts and solution to a pressure sufficient to force the solution into the nut through the shell without disrupting the shell.

8. The herein described process of salting nuts consisting in immersing the nuts with their shells unbroken in a saline solution, subjecting the nuts and solution to a pressure of sufficient force to simultaneously expel the air from within the shells and introduce the solution therein without breaking the shell.

In testimony whereof we affix our signatures in presence of two witnesses.

FRANK BAKER.
HYMAN BAKER.

Witnesses:
JOHN L. FLETCHER,
DAVID W. GOULD.